Figure 1:
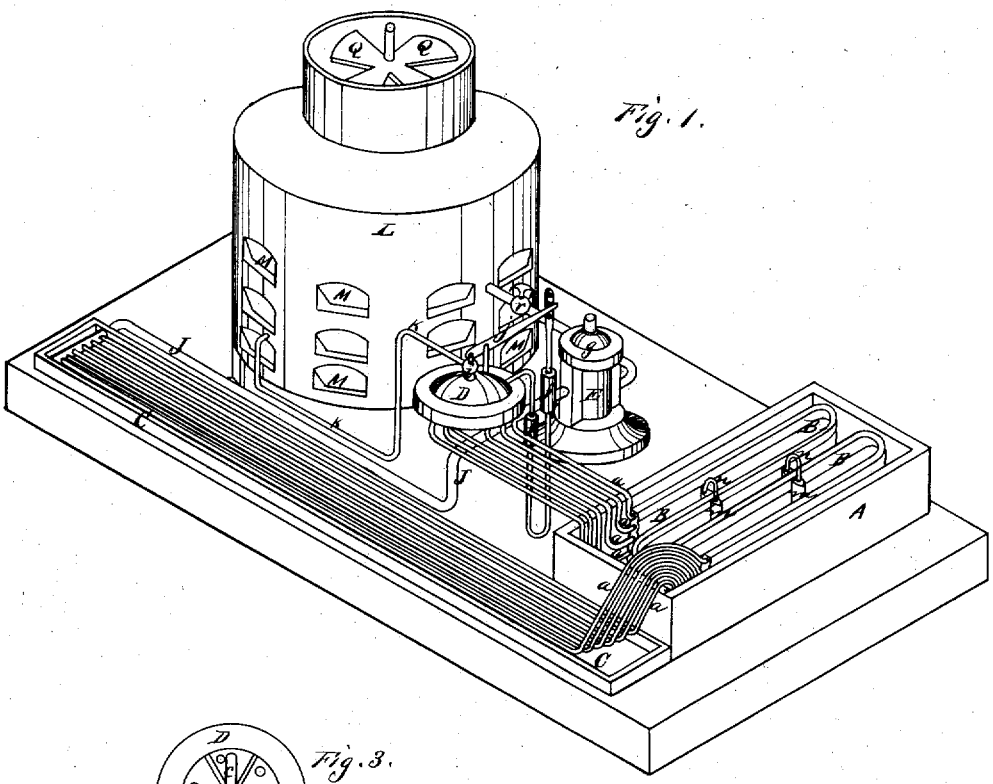

2 Sheets--Sheet 1.

MARTIN & BEATH.

Improvement in Ice-Machines.

No. 4,992. Reissued July 16, 1872.

Witnesses.
Geo. H. Strong.
John L. Smith

Inventors.
Samuel B. Martin.
John M. Beath
By C. M. Smith
attorney

2 Sheets--Sheet 2.

MARTIN & BEATH.

Improvement in Ice-Machines.

No. 4,992. Reissued July 16, 1872.

Witnesses,
Geo. H. Strong.
John S. Smith.

Inventors.
Samuel B. Martin
John M. Beath
By Wm Smith
attorney

UNITED STATES PATENT OFFICE.

SAMUEL B. MARTIN AND JOHN M. BEATH, OF SAN FRANCISCO, CALIFORNIA.

IMPROVEMENT IN ICE-MACHINES.

Specification forming part of Letters Patent No. 127,180, dated May 28, 1872; reissue No. 4,992, dated July 16, 1872.

SPECIFICATION.

*To all whom it may concern:*

Be it known that we, SAMUEL B. MARTIN and JOHN M. BEATH, of the city and in the county of San Francisco and State of California, have invented certain new and useful Improvements in Ice-Making and Refrigerating Machines; and we do hereby declare that the following is a full, clear, and exact description of the same, reference being had to the accompanying drawing and to the letters of reference marked thereon.

Our invention relates to that class of machines in which cold is continually produced by the vaporization, liquefaction, and return for continuous use of a volatile fluid, acting directly on the substance to be frozen, without the intervention of a non-congealable liquid. It consists of three parts or divisions, common to all such machines—namely, congealer, compressing-pump, and condenser.

As the most important part of our invention relates to the congealer we will first briefly refer to the principle on which this part of our invention is based in order that we may better show wherein our invention differs from all others before known or used. It will be apprehended by those who are skilled in the arts to which our invention belongs that the withdrawal of heat from water in quantity sufficient to produce ice in bulk by the vaporization of a volatile liquid contiguous to it involves either a rapid transmission of heat from water to the liquid or the action must be spread over a large surface. As ice is a slow conductor of heat, and as the heat withdrawn has to pass through the ice already formed, a rapid freezing of ice of any considerable thickness is impracticable, and can only be partially urged by vaporizing the liquid at extreme low temperature, and, consequently, low pressure, which can only be accomplished by an unwarrantable expediture of power. Therefore a uniform distribution of both liquid and water over a large surface is a condition indispensable to the production of ice with economy; and we have found its consequent slow formation is essential in producing it in solid and transparent form from undistilled water.

Heretofore the method of freezing by direct contact has been by means of spraying the liquid within the freezing-surface by covering the inner surface of the freezing-vessel with absorbents of the liquid, or by means of expansion-chambers, and more recently by means of hollow slabs or long and narrow chambers holding a specific charge of liquid, sufficient, by its vaporization, to give a stated result or freeze a given quantity of ice on the surface of the containing-vessel; but the vaporization of any liquid offering free space for the escape of the vapor or gas from the surface of the liquid will absorb nearly all its latent heat of vaporization before leaving the surface of the liquid; therefore the constant subsidence of the liquid as it passes off in the gaseous state will inevitably produce an irregular formation of ice. Also, the machines heretofore invented and in use are, from the nature of their construction, practically limited in size, so that in a manufactory of any considerable extent they require to be duplicated.

With the view of avoiding these and other objectionable conditions we have been engaged in a long series of experiments, from which we have discovered that when volatile liquids are vaporized in their passage through long channels or pipes of small sectional area, the liquid particles are carried along by the moving vapor without reference to grade, and may be made to produce nearly a uniform freezing temperature throughout their length by simply adjusting the pressure in said pipes, so that all the liquid particles are vaporized by the time they reach the outlet. By taking advantage of this movement of liquid and vapor together we are enabled to lay our pipes horizontally, however long they may be, and by incasing them in metallic plates at a suitable distance apart we are enabled, with great economy, to produce an immensely large surface, capable of forming transparent ice of uniform thickness from water resting against its sides. Then our channeled plates constructed on this principle consist of vertical metallic plates traversed longitudinally by parallel channels, in which the volatile liquid flows as it expands into vapor or gas, thereby forming ice on either surface.

Figure 3:
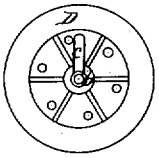
Figure 2:
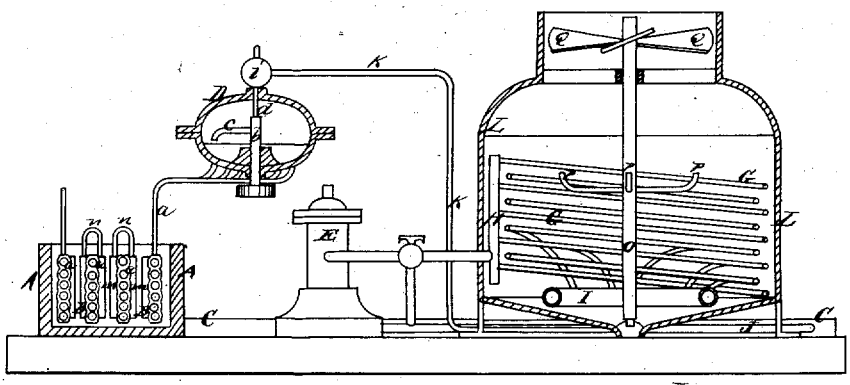
Figure 4:
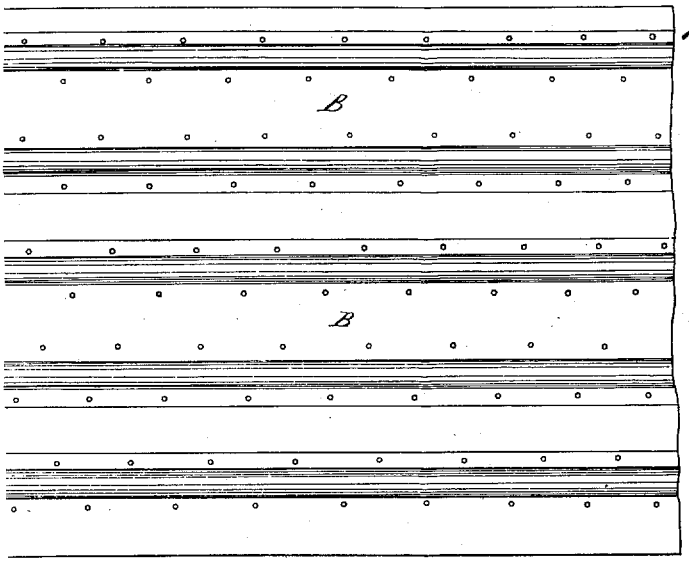
Figure 5:
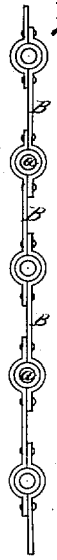
Figure 6:
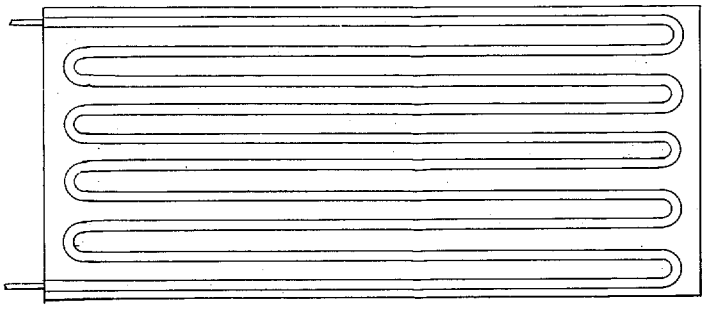
Figure 7:
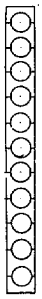
Figure 8:
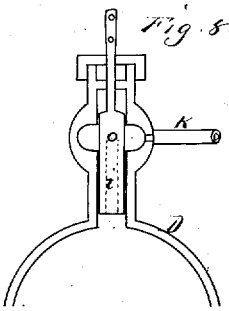

Figure 1 is a perspective view of our whole apparatus, in which B B is a continuous channeled plate lodged in the tank A. L is the condenser, E the pump, and D the distributer. Fig. 2 is a cross-section of the congealer, distributer, and condenser. Fig. 3 shows a transverse section of the distributer. Fig. 4 is an enlarged side view of the channeled plate B B, Fig. 1. Fig. 5 is a cross-section of Fig. 4. Fig. 6 shows a form of channeled plate used for refrigeration and ice-making on the small scale. Fig. 7 is a cross-section of channeled plate used for rapid freezing. Fig. 8 is an enlarged view of the regulating-valve.

We make these channeled plates of the depth required for our sheets of ice, and of the length required for our channels. We find this method of construction preferable to that of returning the same channels in a single plate, as in the latter plan the sheets of ice are thin at the lower edge by reason of the diminution of the freezing-power near the outlet.

In our described method of continuing separate channels through the length of the plate all the thin ice is at or near the outlet-end, and may be allowed to remain until of the proper thickness. Our aim is to construct these freezing-plates so as to expose the greatest practicable amount of surface with a given number of channels and weight of metal, and to avoid joints as far as practicable. We have found that the distance between the channels may be as much as four (4) inches without diminishing the effect when the freezing goes on at the proper rate. In view of these conditions we prefer to form our channels of pipes composed of lead, tin, and antimony, known in the market as composition pipe. This pipe we inclose between plates B of light sheet-iron, each piece being rolled with semi-tubular depressions to receive the pipe. These plates are riveted together, as shown at Figs. 4 and 5, thus forming one plate with the channels before described. This plate is made to return upon itself, as shown at Fig. 1, so that the whole may be placed in a rectangular tank, A, of convenient proportions. We make the space between the folds of the plate sufficient for the formation of the required thickness of ice on each surface, and also a space in the center for the escape of air. By this means we are enabled to make clear and solid ice without any previous preparation of the water, whereas if all the water between the surface is frozen the central portion is invariably opaque and porous. As the gasified liquid is still of low temperature and contains some liquid particles after leaving the congealer, we further utilize it by continuing the congealer-pipes through the trough C, and passing the water to be used in the succeeding charge through this trough in contact with the pipes and in an opposite direction. The trough C (the receptacle for holding or storing the water) and the congealer-tank A we cover with non-conducting material, or place them in a building which is itself made non-conducting.

In order that the freezing action may be equal in each of the plates, if more than one is used, and that it may be equal from the top to the bottom of each of the plates, it is necessary that each of the channels or pipes *a* receive the same quantity of liquid. Besides, any considerable excess of liquid in any one pipe will be carried into the pump and there vaporized and removed by it without deriving any benefit from its vaporization.

We have found the usual means of distribution entirely inadequate to produce the desired result, and have, therefore, invented a device for this purpose which we call the distributer D. It is composed of two hemispheres of cast-iron, bolted together by the flanges. The lower half-sphere is equally divided into compartments, as shown at Fig. 3, into the bottom of each one of which is inserted one of the pipes *a* composing the congealer. In the center of this is a vertical shaft, B, the upper part of which is hollow, as is also the arm C extending from it. Into the end of this shaft the liquid is brought by the pipe K. The constant revolution of this arm deposits an equal amount of liquid in each of the compartments or funnels, which, by its weight, sinks into the pipe connected with it, and thereby secures an exactly equal division of the liquid to each of the pipes, the number of compartments being equal to the whole number of pipes in the congealer. This arm may be moved by the incoming liquid, subject to the high pressure of the condenser, by constructing it in the form of a reaction or Barker wheel; but we prefer moving it more slowly by the shaft passing through a stuffing-box below and driving it by means of a pulley.

In ice-machines heretofore in use the flow of liquid to the congealer has only been governed by the quantity of liquid in the receiver attached to the condenser. In our machine the flow of liquid to the congealer is governed by the quantity of liquid in the congealer itself. It will be seen that any excess of liquid in the pipes will be immediately carried on until it reaches the water-cooler C, when it will be vaporized by the higher temperature of the water surrounding these pipes, which will increase the pressure, and through this increase of pressure the supply is checked by the mercury-gauge *e*. This consists of an inverted siphon, with enlargements *f* and *g* in each leg, as shown in Fig. 1. The difference of level of these enlarged portions is made equal to the height of a column of mercury supported by the average pressure in the congealer. The enlarged portion G contains a float, connected with the lever *j* by the rod *k*. The other end of the lever is connected with a hollow cylindrical valve, *i*, Fig. 8, so that increase of pressure in the pipes of the congealer, acting through the tube upon the mercury in the cylinder *f*, depresses it and raises the float, which closes the valve and checks the flow. A decrease of pressure in like manner increases the flow. In this manner we regulate the intensity of the freezing action throughout the congealer.

Economy of power in working the compressing-pump requires the condenser to be maintained at the lowest temperature practicable. This has heretofore been accomplished by means of a running stream of water of twenty-five to thirty times the quantity actually made into ice. This large volume of water is often difficult to obtain, and is in almost all cases obtained at considerable expense. We substitute in the place of this stream of water atmospheric air, only using water for the purpose of facilitating the transfer of heat from the pipes to the air, the quantity actually consumed being only the small amount conveyed away by the air in the form of vapor. Our condenser is composed of a series of pipes, G, connected with the eduction-pipe H, and descending spirally as they approach the center, and then terminate in the hollow cast-iron cylindrical ring 1, which forms a receiver for the condensed liquid. These pipes and the receiver are inclosed in a cylindrical casing, L, with openings M around the bottom for the admission of air. In the center of the bottom of this casing, which is slightly concave, is stepped a vertical hollow shaft, O, with four arms, P, and carrying a propeller-wheel, Q, at the upper end. This shaft is revolved with sufficient velocity to force the water with which it is charged out of the hollow arm, which descends in the form of spray over the coils of pipe G, while the propeller Q draws the air in through the side openings M and forces it in a gentle current out at the contracted top of the casing. The water falling on the floor of the condenser runs to the center and is again drawn into the shaft, and so continuously circulates, the water serving as a medium through which the heat evolved by the condensing-gas is transferred to the air, through which it is constantly passing as it falls. The upright shaft O contains a check-valve at its foot, and is charged with water through the ends of the arms P before putting it in operation. All joints about our whole apparatus being made perfectly tight by soldering or packing with rubber or lead, we charge it with a volatile fluid. At present we prefer this fluid to be ammonia, which we obtain from the aqua ammonia of commerce by distillation, usually drying the gas as it goes over by passing it through quicklime. We introduce it into our machine by connecting a pipe with our distributer, allowing the gas to drive the air before it, and out through a cock in the receiver 1. We fill this receiver about two-thirds full of liquefied gas. The pump and other machinery being put in operation, a cock in the pipe K is opened, allowing the liquid to pass from the receiver to the distributer D, from thence to the congealer, where it is converted into vapor by the heat withdrawn from the water with which the congealer is filled; thence it passes through the trough C to the pump E, where it is forced into the condenser through the eduction-pipe H. In the pipes of the condenser it is liquefied, runs down the inclined pipes to the receiver 1, from which it is again returned to the congealer, and so on continuously. When the ice is formed on the plates of the congealer of the required thickness it is detached by opening a cock, *r*, and allowing gas from the condenser to flow into the congealer. We divide these sheets of ice into blocks of suitable size for handling by flattened sheet-iron tubes *m*, two of which are shown. These are closed at the bottom, and held in their place, before the ice is formed, by connecting them in pairs by the strap *n*, and are pressed down one on each side of the freezing-plate. After the ice is formed these flattened tubes are filled with water of ordinary temperature, which detaches them from the ice, when they may be withdrawn.

We do not aim to make these cuts more than half the thickness of the sheets of ice, as the superior conducting properties of the tube would cause the ice to freeze thicker there than elsewhere. After the ice is detached from the freezing-plates a bar of iron, inserted into the opening made by the tube, easily cracks the remaining portion of ice, when we float the blocks to one end of the tank, and with suitable tongs and tackle hoist them out. The new charge of water is pumped or run in as the ice is being removed.

In our apparatus we are enabled to use any volatile fluid whose tension of vapor amounts to a few inches of mercury at the freezing-point of water; but economy in motive power and cost of machinery requires us to use such fluid as will absorb the greatest amount of heat in being converted into vapor or gas of given volume and tension, without having to resort to extreme low pressure to vaporize, or extreme high pressure to liquefy it.

Having selected our fluid, we ascertain, from standard authority on the subject, its latent heat; the specific heat of its vapor; also, the tension and volume of its vapor at different temperatures, from which we are enabled to calculate the amount of cold produced by the vaporization of a given quantity of liquid, the pressure required to condense it, and the volume of air required to remove the heat evolved by its condensation, usually allowing the air to be raised in temperature three or four degrees, and the water which goes with it in the form of vapor to absorb and carry about one-fourth the whole amount of heat to be removed. From the above data we are enabled also to calculate the volume of vapor or gas to be removed from our congealer by the compressing-pump, and the power required to work it. In the congealer the liquid uniformly increases in volume as it expands into vapor and approaches the pump, and also diminishes in volume as it recedes from the pump and liquefies in the condenser. Therefore the aggregate sectional area of the pipes in either congealer or condenser should be sufficient to convey the gas or vapor at a velocity not exceeding sixteen (16) feet per second at any point in its course.

We also find it necessary, in order to secure economy in motive power and make solid and transparent ice of convenient thickness, to make the whole freezing-surface of our congealer of sufficient extent to make the required quantity of ice when the congelation goes on at a rate not exceeding one-sixteenth of an inch in thickness per hour. And with the same object of economy in view, we make the whole superficial surface of pipe in our condenser equal to one square foot of surface for every pound of ice or equivalent refrigeration produced per hour.

In our congealer which we have described we freeze homogeneous transparent and solid sheets of ice of convenient thickness—say about six inches. The parallel grooves formed in the surface of the sheets of ice are an advantage, as they serve as guides in subdividing them.

For machines of large size, which may be made of the capacity of ten tons per hour, if required, we make usually each freezing-plate several hundred feet in length, using two or three sizes in each channel, placing the largest size at the outlet.

As short channels are objectionable on account of the difficulty of equalizing the temperature in them, we prefer, in constructing small machines, to make the plates of the length of the containing-tank, and obtain the required length of channels by returning the pipes in the same plate, as is shown in Fig. 6.

In case we are required to form ice of given thickness in less time than can be done by the described form of plates, we make our plates with plain surfaces, and with the channels closer together, filling the intervening space between the pipes with bar or cast iron, rolled or cast to fit the pipe, and protect it, as shown in the cross-section, Fig. 7; or the composition-metal pipes themselves may be drawn of rectangular shape on the outside, so as to be laid one upon another, and thus form the required plane surface in this form of our congealer. We make the distance between the plates, or the distance between the folds of the plates, equal to the required thickness of the sheets of ice, and freeze the intervening water solid. The plane surface of the plates permits the ice to be withdrawn when detached from the plates.

When we use our apparatus for refrigerating rooms, for curing meats, and for other like purposes, we extend our channeled plates in which the volatile fluid is vaporized longitudinally through the center of the room, returning the pipes on themselves, as shown in Fig. 6, so as to place them all in the same vertical plane. The width of room refrigerated by a single plate may be equal to about three or four times its height. A descending current of cold air in the vicinity of the plate is replaced by warmer air from the ceiling, by which means a constant circulation is maintained, and a nearly-uniform low temperature secured throughout the room.

By far the most important feature of our invention is the channeled plates; and it is evident that they may be made up in a great variety of methods and forms. But any plates of metal traversed by or upon which channels are formed and used for the purpose described embodies our invention, whatever the sectional form of the pipes or channels may be, or whether they be laid one on the other, or connected by webs or plates of metal.

Having thus described our invention, we do not claim as new the described method of detaching the ice from the congealer-plates, as that was described by Harrison, of Victoria, Australia, in English patent 747 of 1856; but

What we do claim, and desire to secure by Letters Patent, is—

1. In the congealer of an ice-making machine, channeled walls or partitions, upon which the ice is formed, and within which the freezing agents are distributed in a series of channels, substantially as described.

2. In an ice-making machine, the combination of the following elements, viz., a series of distributing-channels for the freezing agents and surfaces outside and between said channels, upon which the ice is formed, substantially as described.

3. In an ice-making machine, the combination of the following elements, viz., surfaces upon which the ice is formed, a series of distributing-channels for the freezing agents, and means for supplying the freezing agents to the series of distributing-channels, all substantially as described.

4. A system of independent pipes or channels having each pipe adapted to receive an equal amount of liquid, and having the pipes connected in the congealing-chamber in such manner as to present proper surfaces for the formation of the ice, as described.

5. The combination of a system of independent pipes and a distributer for supplying the pipes equally with fluid, as described.

6. The distributer D, constructed specifically as described, for the purpose set forth.

7. The combination of the plates B, provided with semi-tubular depressions, with the pipes, as described.

8. The device for cooling the condensing-pipes, constructed substantially as described, for the purpose set forth.

9. The combination, in a condenser of an ice-machine, of the following elements, *i. e.*, means for conducting the vapor to be condensed into and through the condensing-chamber, means for discharging water in spray, and means for creating a current of air, substantially as described.

10. The means employed for regulating the flow of the liquid by the pressure of the vapor, substantially as described.

11. The combination of the mercury-gauge provided with a float, the intermediate connecting devices, and the valve *i'*, substantially as described.

12. A hollow tube or tubes, adapted to be connected to the freezing-plates for the purpose of dividing the sheets of ice, the same being filled with water of ordinary temperature when it is desired to remove the ice, substantially as described.

13. The flattened tubes *m*, constructed specifically as described.

14. The combination of the congealer, the trough C, and the system of pipes, the latter being carried through the trough to cool the water for the congealing-chamber, substantially as described.

In witness whereof we have hereunto set our hands and seals.

SAML. B. MARTIN. [L. S.]
JOHN M. BEATH. [L. S.]

Witnesses:
C. W. M. SMITH,
PHILIP MAHLER.